CURRENT DRIVE CIRCUIT

Filed Dec. 3, 1962 2 Sheets-Sheet 1

INVENTORS P. A. HARDING
E. H. SIEGEL, JR.
BY Charles Scott Phelan
ATTORNEY

Sept. 27, 1966 P. A. HARDING ET AL 3,275,840

CURRENT DRIVE CIRCUIT

Filed Dec. 3, 1962 2 Sheets-Sheet 2

United States Patent Office 3,275,840
Patented Sept. 27, 1966

3,275,840
CURRENT DRIVE CIRCUIT

Philip A. Harding, Middletown, and Eugene H. Siegel, Jr., Middletown Township, Monmouth County, N.J., assignors to Bell Telephone Laboratories, Incorporated, New York, N.Y., a corporation of New York
Filed Dec. 3, 1962, Ser. No. 241,684
15 Claims. (Cl. 307—88)

Figure 1:
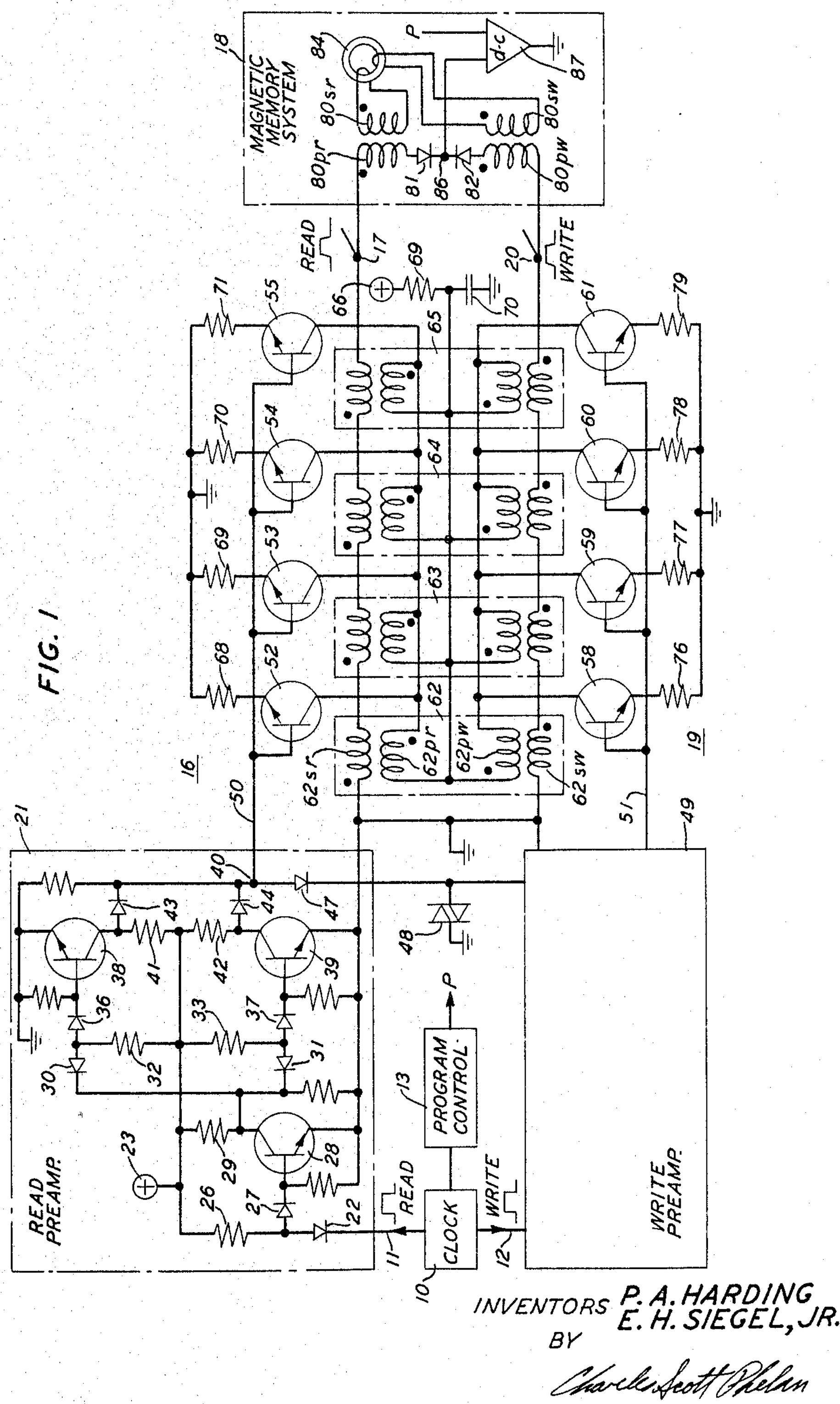

This invention relates to a current pulse generator circuit; and it relates in particular to a current generator, or driver, which is useful for driving access switching circuits of magnetic memory systems such as the memory systems employed for random access stores in an electronic switching system for a telephone central office.

In operating coincident current magnetic memory systems, it is desirable that drive pulses for the memory should be both stable in amplitude and sharply defined to ensure full operation in response to coincident currents and nonoperation if only one drive current is present. Furthermore, certain magnetic memory systems require the use of separate circuits for supplying read and write drive pulses to any particular magnetic memory location. For the latter systems it is necessary that amplitudes of the read and write pulses also be closely controlled with respect to one another in order to assure proper operation of the magnetic storage elements in the memory. If the read and write drive pulse amplitudes do not track one another a variable output signal amplitude from the memory may result.

Accordingly, it is one object of the present invention to generate sharp stable current pulses.

Another object is to generate large amplitude current pulses in response to relatively low level signal input pulses to the current driver, while at the same time utilizing circuit components that are suitable individually for low level circuit applications only.

A further object is to organize separate read and write current drivers for a magnetic memory system in a way which permits each of the drivers to cooperate with the other in fixing the drive pulse amplitude which will characterize the output of both drivers.

An additional object is to ensure that the integral of drive voltage with respect to time, over the interval of a read-write cycle, will be equal to zero. This guarantees that driver operation is independent of memory operation rate.

Still another object is to organize current driver circuits so that their output pulses are shaped in a way which produces maximum efficiency in the energy transfer from the drive circuits to the magnetic storage elements and to any memory output circuits coupled thereto.

These and other objects of the invention are realized in an illustrative embodiment wherein a magnetic memory system employs read and write current drivers constructed in accordance with the present invention. In each driver a preamplifier raises the driver input signal to the desired level. The preamplifier output is utilized to control a plurality of parallel-connected transistor amplifiers. Each of those amplifiers has a transformer primary winding connected in series in its output circuit, and all of such primary windings in one driver are connected in parallel with one another. The secondary windings associated with the aforementioned transformer primary windings are, however, connected in series with one another between the terminals of the current driver load. Each of the transformers in one of the two current drivers has its primary and secondary windings on the same transformer core with the primary and secondary windings of the corresponding transformer in the other driver circuit. The two primary windings on each transformer core are oppositely wound on the core with respect to one another so that the initiation of current flow in the output circuit of the corresponding amplifier in one of the drivers produces a magnetic field intensity in the core of opposite polarity with respect to the field produced by the corresponding transformer in the other driver.

It is one feature of the present invention that the combination of amplifier-controlled and parallel-connected primary windings for the output circuit transformers previously mentioned permits circuit elements which normally have a relatively low current handling capacity to operate for controlling a relatively large current. The combination at the same time ensures that the total load will be substantially equally divided among the various amplifiers. A further inclusion in the combination of series-connected secondary windings for all of the transformers of a current driver gives the circuit the amplitude stability characteristic which results from averaging the outputs of a plurality of series-connected current sources.

It is another feature of the invention that the amplitude of the input signal to the parallel-connected amplifiers is regulated to limit thereby the output pulse amplitude from the series-connected secondary windings at a desired level. The inductive loading of the parallel-connected amplifiers, together with the aforementioned limiting, injects sufficient trapezoidal wave shaping in the output pulse to assure that the rate of change of drive current with respect to time is at substantially its maximum value at the time when the flux density in a bistable magnetic storage element of the driven memory system is at the zero flux density condition while changing from saturation at one polarity to saturation at the other polarity.

An additional feature of the invention is that the parallel-connected amplifiers employ emitter load resistances which are proportional to secure a desired distribution of current among the amplifiers.

Still another feature of the invention is that the series-connected secondary windings of the aforementioned transformers in the two current drivers of a memory system drive through separate isolating diodes to a common gating junction. The coupling transformer windings and the diodes are polarized so that, as long as only one of the current drivers is operating at any one time, the signals coupled from the operating driver through the common cores of the parallel-connected amplifiers in the two drivers forward bias the output diode of the one operating driver and reversely bias the diode of the other driver. Furthermore, this diode-biasing operation is independent of the memory load and the drive current amplitude.

Yet another feature is that circuit elements with low level signal handling capabilities may be used to generate drive signals at levels which are far in excess of the maximum capabilities of the individual elements which are of sufficient energy to operate memory access circuits such as those disclosed, for example, in the C. G. Corbella, P. A. Harding, and E. H. Siegel, Jr., Patent Number 3,205,481.

Figure 2:
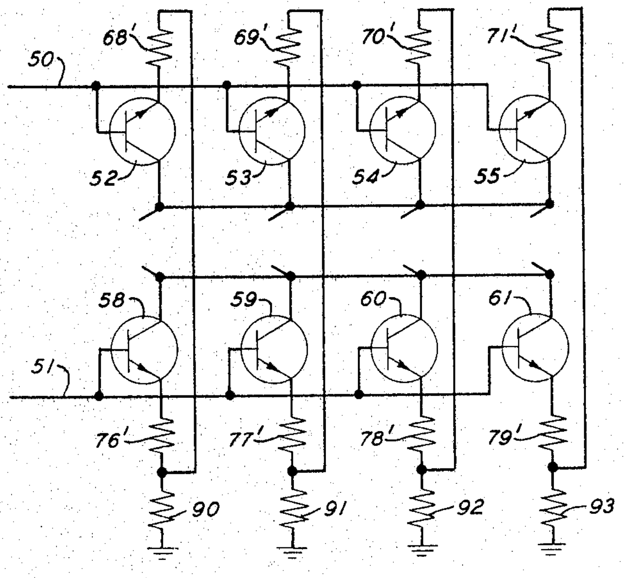
Figure 3:
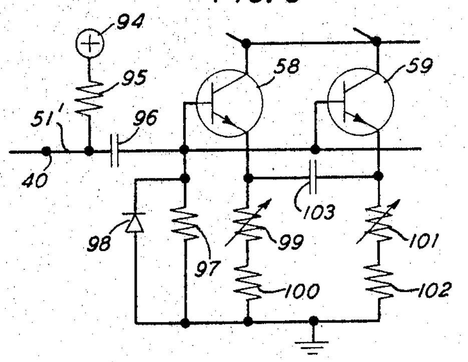

A complete disclosure of one embodiment of the invention as applied to a random access magnetic memory system is provided in the following detailed description, the appended claims, and the attached drawing in which:

FIG. 1 is a schematic diagram of a pair of current drivers in accordance with the invention; and FIGS. 2 and 3 are partial schematic diagrams of modifications of the invention.

In the drawing the current drivers in accordance with the invention receive input clock pulses from a clock signal source 10 on a lead 11 for read pulses and a lead 12 for write pulses. Clock source 10 operates in synchronism with a program control 13 for the over-all central office switching system with which the current drivers are employed. A read current driver 16 is shown in the upper half of the drawing and responds to clock pulses on lead 11 for producing at an output terminal 17 read pulses of proper magnitude and waveshape for operating a magnetic memory system 18 during read intervals in the operating cycle thereof. Similarly, a write current driver 19 in the lower half of the drawing responds to clock pulses on lead 12 for supplying appropriate write pulses to write output terminal 20 for operating memory system 18 during write intervals of its cycle. Read driver 16 and write driver 19 are identical in configuration and are essentially independent of one another except for certain electrical and magnetic coupling therebetween in accordance with the present invention. Accordingly, insofar as the two current drivers are the same, only one need be described.

The first part of read current driver 16 is a read preamplifier 21 in which clock pulses are received to back bias a gating diode 22 for initiating current driver operation. A potential source 23 supplies operating potential to the preamplifier 21 and is, in accordance with the usual convention, schematically indicated by a circled plus sign which represents a potential source with one circuit connection to the terminal of the indicated polarity and with the terminal of the opposite polarity grounded. When diode 22 is reversely biased, current is driven from source 23 through a resistor 26 and a diode 27 into the base electrode of an N-P-N transistor 28. This transistor is thereby biased into conduction and completes a circuit from source 23 through a resistor 29 and the internal collector-emitter circuit of the transistor to ground.

The negative-going potential at the collector electrode of transistor 28 biases two diodes 30 and 31 into conduction to draw current through two resistors 32 and 33 with the result that the anodes of two further diodes 36 and 37 are clamped at a potential which is substantially ground potential. The latter two diodes are held nonconducting so that the base electrodes of two further N-P-N transistors 38 and 39 are also biased at ground potential, and the transistors are thereby held nonconducting. Consequently, source 23 supplies current to a common junction 40 through two parallel paths which include resistors 41 and 42, respectively, and diodes 43 and 44, respectively. This current from source 23 finds its return path to the source through a diode 47 and a voltage regulating varistor 48. Varistor 48 maintains the voltage amplitude at junction 40 substantially constant but may advantageously be replaced by any of the known more complex electronic voltage regulators. Diodes 43 and 44 provide isolation between the circuits of the two transistors 38 and 39 while diode 47 provides isolation in the read preamplifier 21 from any other circuits that may be connected for voltage regulation to varistor 48.

A write preamplifier 49 is provided in write current generator 19 and is indicated schematically by a block since it is identical to the read preamplifier 21. It will be noted, however, that write preamplifier 49 is also connected to ground through varistor 48 so that any aging or environmental factors affecting the operation of that varistor influence the output voltages on lead 50 and on lead 51 in a similar manner. Thus, the output pulses from both preamplifiers are flat-topped pulses with peak amplitudes that are substantially equal to one another.

Drive pulses on leads 50 and 51 each drive the base electrodes of four parallel-connected, common-emitter-connected, transistor amplifiers including, respectively, transistors 52 through 55 in current driver 16, and transistors 58 through 61 in current driver 19. Each of these transistors 52 through 55 and 58 through 61 is normally nonconducting in the absence of a drive pulse on the corresponding leads 50 and 51, respectively. Four essentially linear transformers 62 through 65 are provided for coupling the outputs of the parallel-connected transistors to output terminals 17 and 20. Each transformer includes two primary windings and two secondary windings on the same core as indicated by the broken line enclosure around each transformer.

In transformer 62, a read primary winding **62*pr* is connected in series in the collector circuit of transistor 52 to couple current thereto from a source 66 through a resistor 69. A capacitor 70 is also connected to resistor 69 for bypassing alternating current components of any currents in the transformer circuits to ground. Similarly, a write primary winding 62*pw* is connected in series between resistor 69 and the collector-electrode of transistor 58. These two primary windings are coupled in their respective collector-electrode circuits to their corresponding read and write secondary windings 62*sr* and 62*sw***.

Dots have been placed adjacent to the ends of the windings of transformers 62 through 65 to indicate winding direction relationships among coupled coils in accordance with the usual convention. It can be observed from the dots that the windings **62*pr* and 62*pw* are wound in opposite directions on the common core structure for transformer 62. The reason for this is that the repeated application to a transformer of direct-current pulses of a single polarity tends to develop a saturated remanent flux condition in the core with a polarity corresponding to the drive pulse polarity and with an accompanying reduction in transformer action. Furthermore, from a long time average standpoint, and in situations where the transformer winding time constant is longer than the memory read-write period, such action tends to build up a voltage bias on the transformer winding terminal which is remote from the indicated potential source 66. This bias can build up because the nature of a transformer requires that the long time integral of voltages developed across the transformer must equal zero. Since the primary windings 62*pr* and 62*pw* are oppositely poled on the common core, current pulses which are coupled therethrough to the corresponding transistors tend to drive flux in opposite directions with respect to one another so that, as long as the read and write clock pulses alternate with one another, the core of the transformer 62 is recycled around a closed hysteresis loop during each read-write cycle. This action prevents the buildup of a bias, and it further prevents the development of a saturated core condition in the transformer 62**.

Transformers 63 through 65 connect their corresponding transistors to source 66 in the same manner that transformer 62 connects transistors 52 and 58 to source 66. Furthermore, the transformers 63 through 65 are of the same type as transformer 62 in that each has two primary and two secondary windings on a common core and polarized for recycling its core during each read-write cycle of the two current drivers 16 and 19.

Resistors 68 through 71 are connected to the emitter electrodes of transistors 52 through 55, respectively, and have the other terminals thereof connected together to ground. Similarly, resistors 76 through 79 couple the emitter electrodes of transistors 58 through 61 to ground. Resistors 68 through 71 control the division of the read current load among their associated transistors 52 through 55, respectively, and are equal to one another in the embodiment here considered. Resistors 76 through 79 similarly divide the write current equally among their respective transistors 58 through 61.

The read secondary windings of transformers 62 through 65 are connected in series-aiding relationship with one another between ground and output terminal 17. Similarly, write secondary windings of transformers 62 through 65 are connected in series-aiding relationship between ground and output terminals 20. The arrangment within each current driver of parallel-connected primary windings in the output circuits of parallel-connected amplifiers compels substantially equal division of the total output voltage among the parallel-connected amplifier circuits. Similarly, the total load current is divided among the amplifiers in accordance with the sizes of their emitter circuit resistances. As long as the emitter resistances of the amplifiers are substantially equal to one another, the current will be substantially equally divided among the amplifiers. Thus, the transistors which are characterized by relatively small current handling capacities are able to cooperate with one another in their parallel-connected amplifier circuits to control a much larger load current than any one of them could handle by itself. At the same time, substantially equal division of the load among the transistors is ensured by the arrangement of emitter circuit resistors and the parallel-connected, collector circuit, transformer, primary windings.

The secondary windings of all of the transformers in any one of the two current drivers are all connected in series-aiding relationship, and the primaries are connected in parallel, as previously mentioned, and give the output load current a predictable magnitude equal to the average of the individual currents even though stock circuit elements with standard manufacturing tolerances are employed. It might be expected that total output current variations among drivers and resulting from circuit element variations within tolerances ranges would be approximately within the same percentage ranges as the expected variations among the four parallel-connected transistor circuits within a driver. This, however, is not the case. It can be shown statistically, and it has been found in practice, that by averaging the outputs of plural stages within each driver the variance among the averaged outputs of plural drivers is reduced by a factor $n$ compared to the variance among the outputs of single-stage circuits, when $n$ is the number of circuit outputs that are averaged. Thus, the drive current at terminal 17 in FIG. 1 has a variance that is one-fourth the variance of the output of any one of the circuits of transistors 52 through 55. The illustrated technique permits a manufacturer to utilize stock circuit elements and know in advance that the variance among output currents of plural, similarly-constructed drivers will be considerably smaller than he would experience without the averaging within each driver. This same benefit, is of course, realized by the series-connected secondary windings which appear in the write current driver 19.

Within the memory system 18 a plurality of inductive load circuits are coupled to output terminals 17 and 20 of the current drivers 16 and 19, respectively. One such circuit is schematically represented by coupling transformer primary windings 80*pr* and 80*pw* which are connected in series with one another and with a pair of oppositely poled diodes 81 and 82 between the terminals 17 and 20. Other similar inductive load circuits connected to terminals 17 and 20 are schematically indicated by the unterminated diagonal line extending from each of those terminals. One such load circuit may be selected for actuation by operation of a switch 87, one of which is associated with each load circuit. One switch 87 is selected by a signal supplied by program control 13 over a circuit P.

Within memory system 18 secondary windings 80*sr* and 80*sw* are coupled to primary windings 80*pr* and 80*pw* for driving the access circuits of a magnetic storage array, schematically indicated by a bistable magnetic core 84, in the manner which is described in detail, for example, in the aforementioned Corbella et al. patent. Core 84 has two, stable, remanent flux conditions of opposite polarity, and pulse potentials developed across windings 80*pr* and 80*pw* cause the flux in core 84 to be switched back and forth through a zero flux density condition between the two stable conditions.

An interesting feature of the current driver circuits of the invention may be noted by observing the transformer winding and diode polarities in connection with a typical current driver operation. Thus, for example, a positive clock pulse on lead 11 causes read preamplifier 21 to produce a much larger positive pulse on lead 50 to bias transistors 52 through 55 into conduction. Current is then drawn from source 66 through the read primary windings of transformers 62 through 65 and their associated transistors to develop a potential difference across each of those primary windings of transformers 62 through 65 and their associated transistors such that the dotted terminal thereof is negative with respect to the other terminal. This potential is inductively coupled to the corresponding read secondary windings so that read output terminal 17 is positively biased with respect to ground.

If program control 13 has selected a programmed, direct-current switch 87 for operation when terminal 17 is positive, junction 86 is clamped to ground and a current flows from terminal 17 to ground through winding 80*pr* and diode 81. The aforementioned Corbella et al. patent discloses one example of a switch that can be used for switch 87. During the same read pulse interval there is no signal on output lead 51 and the write driver transistors 58 through 61 are biased nonconducting. The corresponding write primary windings of transformers 62 through 65 are accordingly open circuited and do not enter into the operating picture significantly.

The write secondary windings of transformers 62 through 65 have induced therein, from the read primary windings, voltages which are negative with respect to ground as can be deduced from the locations of the dots at the winding terminals. This negative potential appears at write output terminal 20 and is of substantially the same magnitude as the read pulse just mentioned at terminal 17, but of opposite polarity. Accordingly, diode 82 is reversely biased to prevent conduction from write output terminal 20 to ground through programmed switch 87. In a similar manner diode 81 isolates read terminal 17 from ground during write pulse intervals. These two diodes, and the described arrangement of transformers 62 through 65, assure isolation between the output circuits of read driver 16 and write driver 19 insofar as selector switch 87 is concerned.

Still another interesting feature of the invention may be observed in the drawing. It is well known that magnetic switching devices respond to switching signals with a speed which is proportional to the rate of change of drive current. For this reason it was formerly thought that it was desirable to obtain drive pulses with the leading edges thereof being as close as possible to the vertical. It has been found, however, that the penchant to obtain vertical leading edges on drive pulses may be carried too far. A bistable magnetic device of the sort usually used in memory systems, such as the memory system 18, stores information in a binary code by resting in one of its two stable conditions of remanent flux. This information is converted to electric pulses by causing the device to switch toward a predetermined saturated flux condition and detecting induced voltage changes in a sensing circuit that links the magnetic device. The largest induced voltage occurs at the time of greatest rate of flux change, and in the usual rectangular hysteresis characteristic of bistable magnetic devices that time is the time when the flux density is approximately zero. If the drive pulse current is still changing when the device is passing through the zero flux density condition, the device can also serve as a transformer for coupling energy directly from the drive circuit to the sensing circuit and thereby enhance the sensing circuit signal generated as a result of the device switching function alone. This enhanced operation is described in more detail in connection with one specific embodiment in a patent 3,164,728 in the name of P.A. Harding.

However, a finite time interval is required to accomplish magnetic device switching from one stable state to the other. If a drive pulse leading edge is too steep, its time of maximum rate of change of current will have passed before the device reaches its zero flux density condition. When this occurs the enhanced energy transfer between the drive circuit and the sensing circuit coupled to the magnetic switching device is lost. In the current drivers of the present invention, however, the inductive loading represented by the transformers in the output circuits of the parallel-connected amplifiers produces a beneficial effect in that it gives the output read and write pulses somewhat of a trapezoidal configuration as illustrated in exaggerated form by the read and write pulse waveforms adjacent terminals 17 and 20. The inductive loading is specifically proportioned in relation to emitter resistors of the parallel-connected amplifiers to produce an essentially linear slope that is not topped out by varistor 48 before core 84 has reached the zero flux density condition. This slight sloping of the drive pulse leading edge is sufficient to assure that the rate of change of drive current will still be a maximum at the time when the driven switching device, core 84, in memory system 18 is passing through its most sensitive flux condition, i.e., the condition wherein the flux density is equal to zero; and yet the sloping leading edge is amply steep to produce rapid operation of the switching device. The trailing edge of each pulse has an exponential configuration so that the total pulse has an essentially trapezoidal shape. Thus, the inductive circuit elements which produce the previously described load stabilizing effects in the current driver circuits of the invention, are also utilized to produce a beneficial tempering of a drive pulse waveshape requirement, which tempering was heretofore thought to be intolerable.

FIG. 2 is a partial schematic diagram illustrating a modification of the current drivers in FIG. 1. It was previously noted in connection with FIG. 1 that the use of a common varistor 48 for the read and write generators contributed to amplitude tracking of the two generators. Also, the described transformer connections permitted an averaging of currents within each generator which reduced the variance among generators to a range much narrower than the variance normally encountered among stock circuit elements used in the generator. There are a number of ways to extend these concepts of improving tracking of plural generators and reducing variance among generators. FIG. 2 shows one such way.

In FIG. 2 only the emitter circuits of transistors 52 through 55 and 58 through 61 are changed so only that part of the FIG. 1 diagram is shown. In FIG. 2 the tracking of read and write current drivers is improved by returning the emitter electrodes of corresponding read and write transistors to ground through the same resistor. Thus, resistors 68′ and 76′ each have one terminal connected to their corresponding transistors 52 and 58; and their remaining terminals are connected to ground through a common emitter resistor 90 which is much larger than either of the resistors 68′ or 76′. Similarly, resistors 91, 92, and 93 provide ground return paths for their corresponding read-write transistor pairs 53–59, 54–60, and 55–61. The principal factors which tend to produce changes in transistor current are variations in varistors and in emitter circuit resistances. When read and write drivers share these elements, as in FIG. 2, the variations in the two drivers are the same; and the driver output amplitudes tend to be the same. However, the fact that each of the four stages of corresponding transistors has an individual common emitter return resistor contributes to the reduction of the driver variance.

A further illustrative extension of averaging to reduce the variance among drivers could be accomplished by providing for each stage of the cooperating read-write drivers a separate varistor 48. Cooperating with the varistor of each stage would be a separate set of diodes 43, 44, and 47, and lead 50 in the read generator 16 of FIG. 1 and a similar set of separate elements in the write generator 19.

FIG. 3 shows another partial schematic diagram illustrating a further modification of the invention. Here lead 51′ is capacitively coupled to the base electrodes of the write driver transistors, only two of which are shown, by a capacitor 96. A source 94 is connected through a resistor 95 to lead 51′ to establish a reference charge level on capacitor 96. A resistor 97 supplies the emitter-base return path, and a diode 98 shunts resistor 97 in the absence of positive drive on lead 51′ to provide a low resistance discharge path for capacitor 96. This coupling arrangement for capacitor 96 prevents the parallel-connected transistors from drawing sustained current if there should be no input signals thereto for a long period of time.

A rheostat 99 and a resistor 100 are connected in series between the emitter electrode of transistor 58 and ground. Rheostat 101 and resistor 102 similarly connect transistor 59 to ground. It has been found that the transistors in the current drivers tend to oscillate at a frequency about an order of magnitude above the maximum operating frequency of the transistor. This is believed to be a function of the emitter circuit resistance, parasitic capacitances associated with each transistor, and the transistor itself. To correct this, a capacitor 103 couples the emitter electrodes of transistors 58 and 59 together. At the oscillatory frequencies, capacitor 103 is such a low impedance that each of the two transistors sees in its emitter circuit the reduced resistance represented by the parallel combination of their two emitter circuits. However, at the normal operating frequencies capacitor 103 is such a high impedance that it has no substantial effect. This connection of capacitor 103 has been found to suppress the oscillations. The other two write driver transistors 60 and 61 are similarly paired with respect to emitter circuits, as are the read driver transistors 52, 53 and 54, 55.

Although this invention has been described in connection with a particular embodiment thereof, it is to be understood that additional embodiments and modifications, as well as features not specifically mentioned herein, which will be apparent to those skilled in the art are included in the spirit and scope of the invention.

What is claimed is:

1. A current driver circuit comprising
a source of current pulses,
plural amplifier circuits, each having input and output connections,
means applying said pulses in parallel to said amplifier input connections,
plural transformers, each having a primary winding and a secondary winding, each of said primary windings being connected in series in the output connections of a different one of said amplifier stages,
means further connecting all of said primary windings in parallel with one another,
an output connection for said driver circuit, and
means connecting all of said secondary windings in series-aiding relationship across said output connection.

2. The current driver circuit in accordance with claim 1 in which said source includes voltage regulating means connected to limit the maximum voltage applied to the inputs of said amplifier stages for thereby limiting the maximum output current in said secondary windings.

3. The current driver circuit in accordance with claim 1 in which
each of said amplifier circuits comprises a transistor connected in the common emitter configuration, each of said transistors having a base electrode, an emitter electrode, and a collector electrode, said base electrode is connected to its respective amplifier input circuit to receive said current pulses,
a single source of operating potential is connected to said collector electrodes through said primary windings, and
a resistive circuit interconnects said emitter electrodes with said source.

4. The current driver circuit in accordance with claim 3 in which said resistive circuit comprises
a plurality of individual resistors, each having one terminal thereof connected to a different one of said emitter electrodes, the remaining terminals of all of said resistors being connected together to define a common junction, and means connecting said common junction to said potential source.

5. A current driver circuit for magnetic memory systems, said circuit comprising first and second pluralities of amplifier stages, each of said stages having input and output connections, first and second source of noncoincident pulses, means applying pulses from said first source to the input connections of said first plurality of stages in parallel, means applying pulses from said second source to the input connections of said second plurality of stages in parallel, a plurality of transformers each having on a single core structure first and second primary windings and first and second secondary windings, means connecting each of said first primary windings in series with the output connection of a different one of said first plurality of amplifier stages, means connecting said first secondary windings in series-aiding relationship, a first load circuit connected to the ends of the series combination of said first secondary windings, means connecting each of said second primary windings in series in the output connection of a different one of said second plurality of amplifier stages, means connecting said second primary windings in parallel with one another, means connecting said second secondary windings in series-aiding relationship, and a second load circuit connected between the ends of the last-mentioned series-aiding connection.

6. The current driver circuit in accordance with claim 5 in which a single voltage regulating means is connected to all of said amplifier input connections for limiting the peak amplitudes of said pulses, a plurality of resistors are provided, and means connect each of said resistors to be included in the output connection of a different one of the amplifier stages in said first plurality of amplifier stages and also in a corresponding one of the amplifier stages in said second plurality of stages.

7. The current driver circuit in accordance with claim 5 in which the stages in each of said first and second pluralities of stages are arranged in pairs of stages, each of said stages includes a transistor having an amplifier stage input electrode, an amplifier stage output electrode, and an electrode common to both the input and output of the amplifier stage, and frequency-sensitive impedance means are connected between the common electrodes of the transistors of each of said pairs of stages.

8. The current driver circuit in accordance with claim 5 in which first and second diodes are connected in said first and second load circuits, respectively, said first diode is poled to be forward biased by signals coupled thereto from said first source by said first plurality of stages and reversely biased by signals coupled thereto from said second source by said second plurality of stages and said first secondary windings, said second diode is similarly forward biased by pulses from said second source and reversely biased by pulses from said first source, and both of said load circuits include a common current return circuit to said amplifier stages.

9. The current driver circuit in accordance with claim 5 in which in each of said transformers, said first and second primary windings link the single core structure thereof in senses such that core flux oriented by a pulse from one of said pulse sources is reversed by a pulse from the other of said sources.

10. The current driver circuit in accordance with claim 8 in which in each of said transformers, said first and second primary windings link the single core structure thereof in senses such that core flux oriented by a pulse from one of said pulse sources is reversed by a pulse from the other of said sources.

11. The current driver circuit in accordance with claim 5 in which each of said load circuits includes inductive means proportioned to inject an essentially linear finite slope in the leading edges of pulse potentials developed across such loads.

12. The current driver circuit in accordance with claim 11 in which a bistable magnetic device is coupled to each of said load circuits to have flux therein switched back and forth through a zero flux density condition between two remanent conditions of oppositely polarized flux by pulse potentials developed across such load circuits, and said inductive means being further proportioned so that the slope of said leading edges is of sufficient duration to overlap in point of time the zero flux density condition in said device.

13. The current driver circuit in accordance with claim 12 in which voltage regulating means connected to all of said amplifier input connections limit the peak amplitudes of said pulses and thereby limit the magnitudes of said pulse potentials.

14. A current driver circuit comprising a source of pulses, an amplifier having its input connected to receive pulses from said source, an output circuit for said driver circuit, a transformer having a magnetic core and connected for coupling the output of said amplifier to said output circuit, said transformer having a time constant which is longer than the pulse repetition period of pulses from said source, and means coupled to said transformer for recycling said core after each of said pulses.

15. A current driver circuit comprising a source of pulses, a plurality $n$ of pulse amplifiers each having an output pulse amplitude probability of variance of $v$, means connecting the inputs of said amplifiers to said source, and means coupling the outputs of said amplifiers in series to produce an output pulse amplitude probability of variance of $v/n$.

No references cited.

BERNARD KONICK, *Primary Examiner.*

S. M. URYNOWICZ, *Assistant Examiner.*